May 10, 1932.  F. J. DOUGLASS  1,858,076
APPARATUS FOR CUTTING PIPE FOR ANGLE BENDS
Filed Nov. 6, 1930  3 Sheets-Sheet 2
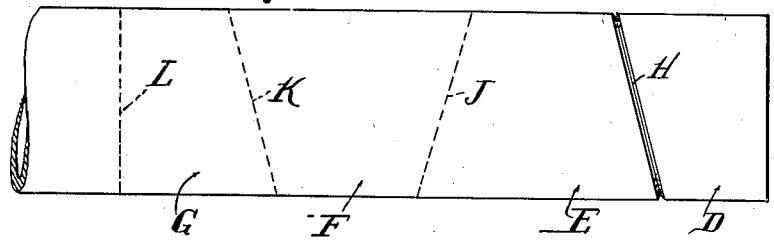
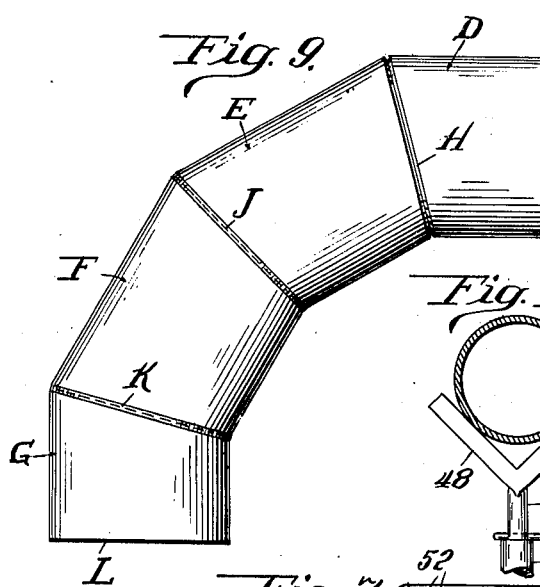
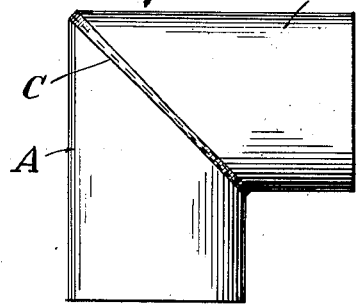
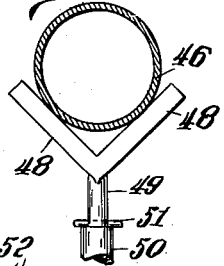
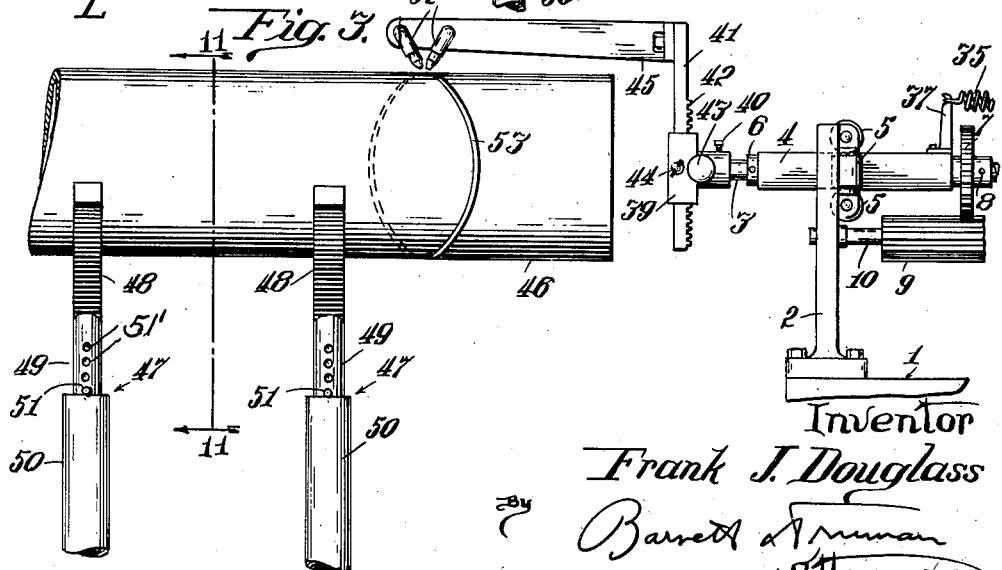
Inventor
Frank J. Douglass
By
Attorneys

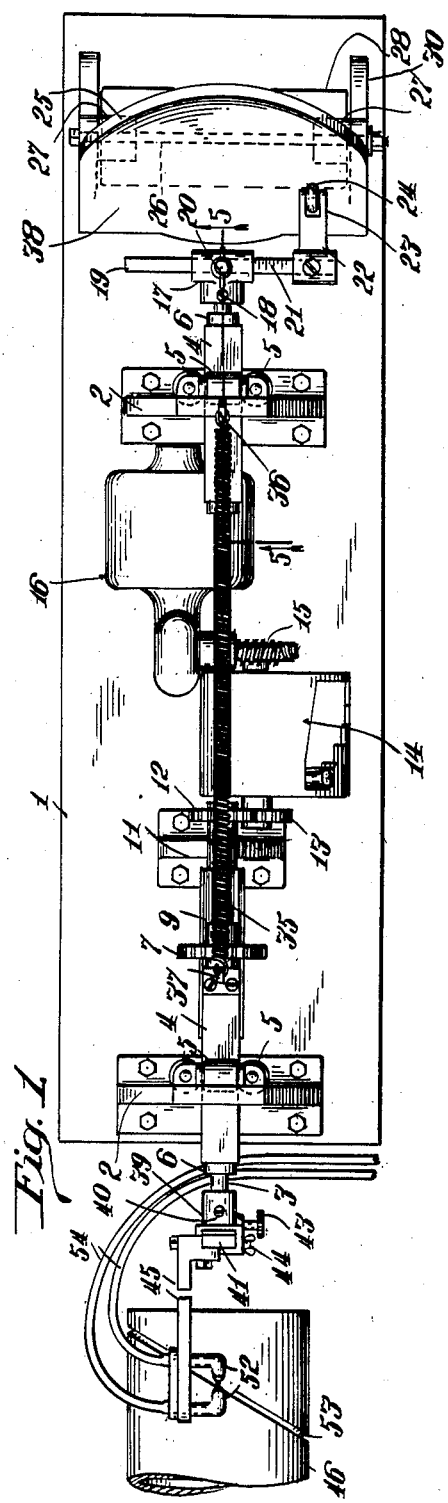

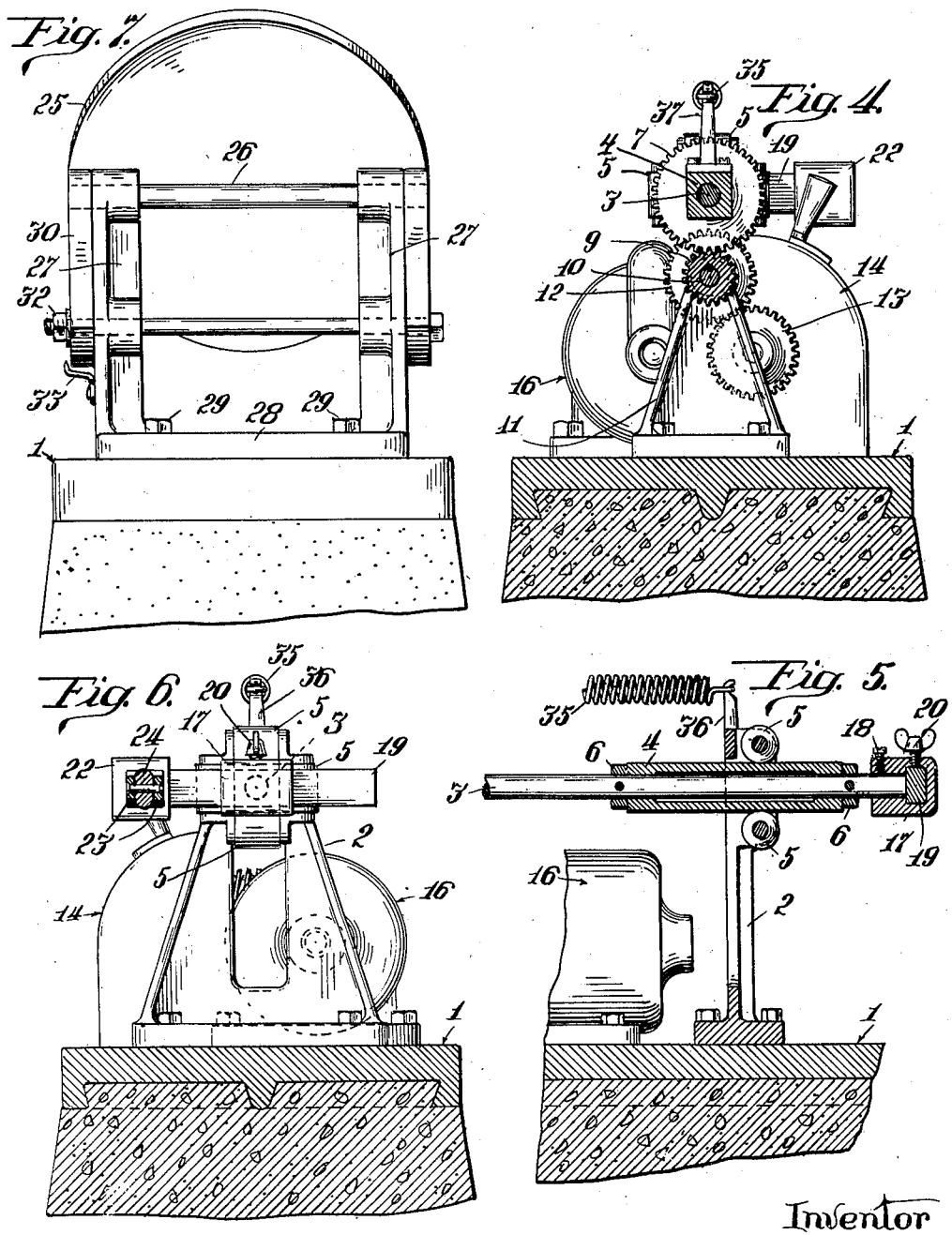

Patented May 10, 1932

1,858,076

UNITED STATES PATENT OFFICE

FRANK J. DOUGLASS, OF CHICAGO, ILLINOIS, ASSIGNOR TO DOUGLASS BROTHERS COMPANY, OF CHICAGO, ILLINOIS, A CORPORATION OF ILLINOIS

APPARATUS FOR CUTTING PIPE FOR ANGLE BENDS

Application filed November 6, 1930. Serial No. 493,819.

This invention relates to certain new and useful improvements in an apparatus for cutting pipes for angle bends, and more particularly to an improved machine for automatically cutting off sections of pipe and simultaneously beveling the cut edges of both of the separated sections so that both of the pipe sections are prepared for being welded together as part of an angle bend.

When pipe sections are cut for use in L bends or multi-part angle bends, it is necessary that the pipes be cut through in a plane which intersects the longitudinal axis of the pipe at an angle depending upon the angle of the bend to be formed. For example, if an L bend is to be formed, the pipe is cut through in a plane intersecting the axis of the pipe at an angle of 45°. For multi-part bends, the angle of cut will be smaller. In order to provide a proper channel for the soldering metal used in the welding process, it is essential that the edge of the cut surface at the end of the pipe section be beveled. Since two pipe sections to be joined are cut at the same angle, a single cut through the pipe will prepare the ends of two adjacent cut sections for joining as parts of the angle bend. Accordingly, it is desirable that both sides of the cut be beveled so as to simultaneously prepare the cut ends of both of these sections for the welding process. The present machine is adapted to make a continuous clean cut in a pipe section and simultaneously bevel this cut in opposite directions at its two sides so that both of the pipe sections separated by the cut will be prepared for the bevelling process.

Briefly described, the machine comprises a supporting frame in which a main operating shaft is journaled for both rotary and bodily movements longitudinally of its axis. Means is provided for rotating the shaft while at the same time permitting it to move longitudinally. At one end of the shaft an offset bracket frame which is adjustable radially of the shaft in accordance with the size of pipe to be operated upon, carries a pair of cutting torches which are inclined inwardly toward one another at similar angles so as to form a single cut in the pipe surface with oppositely beveled edge portions. A roller carried by a radially adjustable bracket at the other end of the shaft is adapted to travel on an inclined directing plate, and a spring is mounted so as to continually urge the shaft and roller toward this directing plate. By suitably adjusting the inclination of the directing plate and the radius of the path traveled by the roller on said plate, the angle of the path of travel of the cutting torches around the pipe is determined.

The principal object of this invention is to provide an improved pipe cutting and beveling apparatus such as briefly described hereinabove and disclosed more in detail in the specifications which follow.

Another object is to provide improved means for producing a double beveled cut surface in the pipe section.

Another object is to provide improved means for producing the desired rotary and longitudinal movements of the operating shaft.

Another object is to provide improved means for adjusting the angle at which the pipe section is cut.

Another object is to provide an improved apparatus for cutting and beveling the adjacent ends of two severed pipe sections, entirely automatically, and in a single operation so that both sections are prepared without additional beveling of the cut surfaces for an angle pipe bend.

Other objects and advantages of this invention will be apparent from the following detailed description of one approved form of apparatus built and operating according to the principles of this invention.

In the accompanying drawings:

Fig. 1 is a plan view of the assembled apparatus in operation.

Fig. 2 is a side elevation of the apparatus shown in Fig. 1.

Fig. 3 is an elevation of the parts shown at the left-hand end of Fig. 2, this figure being, in effect, an extension of the left-hand portion of Fig. 2.

Fig. 4 is a transverse vertical section taken substantially on the line 4—4 of Fig. 2, and on a large scale.

Fig. 5 is a partial longitudinal vertical section, taken substantially on the line 5—5 of Fig. 1.

Fig. 6 is an elevation of the right-hand end of the machine, with the directing plate removed.

Fig. 7 is a rear elevation of the directing plate mechanism, the view being taken from the right hand end of Figs. 1 and 2.

Figs. 8 and 9 are views of pipe bends for which sections may be cut by this machine.

Fig. 10 is a view of a pipe section as partially cut to form the bend shown in Fig. 9, the locations of the cuts yet to be made being indicated in dotted lines.

Fig. 11 is a detail vertical section taken on line 11—11 of Fig. 3.

Referring first to Figs. 8, 9 and 10, Fig. 8 shows a pair of pipe sections A and B, each of which is cut at one end at an angle of 45° so as to be joined together along the line C to form an L angle. Fig. 9 shows an angle bend consisting of four sections D, E, F and G, and it will be apparent that in this case the ends of the joined sections are cut at a smaller inclination to the axis of the pipe sections. Fig. 10 illustrates a section of pipe which is cut so as to form the pipe sections necessary for the angle bend shown in Fig. 9. It will be noted that by making the single cut illustrated at H in Fig. 10, and then rotating one of the sections D or E through an angle of 180° with relation to the other of these sections, the parts may again be fitted together along the severed line H as shown in Fig. 9 to form a portion of the angle bend. As shown in Fig. 9, it is desirable that both sides of the line of joined surfaces H be beveled so as to form a channel for receiving the soldering metal when the sections are welded together. It is therefore desirable that both sides of the line of cut H be beveled as the cut is made, as indicated in Fig. 10, and the apparatus hereinafter described is adapted to cut the pipe section in this manner. It will be apparent that the pipe section shown in Fig. 10 will be similarly cut along the lines J, K and L to complete the other pipe sections E, F and G, which are subsequently joined as shown in Fig. 9.

Referring now to Figs. 1 to 7, the approved apparatus for cutting pipe sections of the above noted form will now be described. The supporting frame comprises a table or pedestal 1 which carries a pair of spaced apart uprights or standards 2 for supporting the main operating shaft 3. Shaft 3 is journaled in a pair of bearing blocks or journal boxes 4 each of which has a square or rectangular outer cross section and is supported by and guided for longitudinal movement between a set of rollers 5 mounted in one of the uprights 2. Collars 6 secured to the shaft 3 adjacent each end of each bearing block 4 compel the shaft 3 and bearings 4 to move longitudinally together, while permitting the shaft to rotate within the non-rotating journal bearings.

For the purpose of rotating the shaft 3 while at the same time permitting its longitudinal bodily movements, a spur gear 7 is secured on shaft 3 as at 8, the gear 7 meshing with a rather long cylindrical gear 9 keyed on the countershaft 10 which is journaled in one of the uprights 2 and in an auxiliary upright or standard 11. Shaft 10 is driven through the intermeshing spur gears 12 and 13 from a change-speed gear box 14, which in turn is driven through suitable reducing gears 15 from a motor 16 or any other suitable source of power. It will be apparent that the speed of rotation of the operating shaft 3 can be varied by means of the change-speed gears 14, and that the shaft 3 can reciprocate while it is thus being rotated, the gear 7 which moves with the shaft 3 sliding endwise along the cylindrical driving gear 9.

At the right hand end of shaft 3 (as shown in Figs. 1 and 2), a T-shaped socket member 17 is secured on the end of the shaft 3 as by means of set screw 18. A supporting arm 19 is adjustable radially of shaft 3 through the socket 17, the arm 19 being clamped in position by means of the locking screw 20, and the position of adjustment being indicated by the calibrated scale 21 on one side of the arm. A bracket arm 22 secured to one outer end of supporting arm 19 has a yoke 23 at its free outer end in which is freely pivoted a roller 24.

The directing plate 25 is pivotally supported by a horizontal shaft 26 journaled in the spaced vertical arms 27 of a pedestal or supporting frame 28 secured on the table 1 as at 29. A sector plate 30 provided at one side of directing plate 25 is formed with an arcuate slot 31 through which projects a locking screw or bolt 32 carried by the side arms 27 of the pedestal whereby the inclination of directing plate 25 may be adjusted as desired. An index pointer 33 mounted on the pedestal cooperates with a scale 34 on the sector plate to determine the angle of inclination of the directing plate 25.

A contractile spring 35 is anchored at one end to a fixed abutment 36 carried by one of the uprights 2, and is secured at the other end to a bracket arm 37 mounted on one of the movable bearing blocks 4. As this spring 35 contracts it continually tends to urge the shaft 3 bodily toward the right, as seen in Figs. 1 and 2, so as to hold the roller 24 against the plane face 38 of directing plate 25. As the shaft 3 is rotated, the roller 24 will be revolved about the axis of the shaft and will travel in a circular path on the face 38 of the directing plate 25.

At the opposite end of shaft 3, the cutting torch assembly is removably mounted by means of a socket member 39 secured on the shaft by set screw 40. A supporting arm 41 is radially adjustable through socket 39 by means of a rack and pinion mechanism 42 actuated by a knob 43, the arm 41 being locked in adjusted position by means of thumb screw 44. The torch supporting arm or bracket 45 is supported from one outer end of arm 41 and projects substantially parallel to the axis of shaft 3 and of the pipe section to be cut which is indicated at 46. As best shown in Fig. 3, the pipe section 46 is supported in any suitable manner so that its longitudinal axis will coincide with a prolongation of the axis of main operating shaft 3. The pipe sections may be supported upon a plurality of horses or pedestals 47 formed with upper forked arms 48 between which the pipe rests, each vertical supporting post 49 telescoping within a supporting pedestal 50 and being adjustable in height by means of a supporting pin 51 which is inserted in any one of a plurality of holes 51' in the post 49.

It will now be apparent that the bracket arm 45 projects alongside the outer surface of pipe section 46 and will be revolved therearound as the shaft 3 is rotated. This bracket arm 45 carries a pair of similar cutting torches 52 which are inclined inwardly toward one another so that their flames will cut a single path or opening 53 in the pipe section. Due to the inclination of the cutting jets, the side edges of this cut 53 will be beveled inwardly in opposite directions, as already indicated at H in Figs. 9 and 10. The torches 52 may be mounted in bracket arm 45 in any suitable manner so that their relative inclinations can be adjusted if necessary, and the torches are supplied with the necessary combustible fluids through flexible pipes or tubes such as indicated at 54.

By means of this machine pipe sections of any diameter (within certain limits) can be cut at any desired angle to form a pipe bend. The pipe supports 47 are first adjusted to the proper height to support the pipe section in proper alignment with the operating shaft 3. The torch-supporting bracket arm 41 is then adjusted radially so as to bring the torches in the proper cutting relation to the outer surface of the pipe section 46. The directing plate 25 is adjusted to the desired angle of cut, and the roller 24 is adjusted radially so that the radius of the circular path which it follows on the face of the directing plate will correspond to the radius of the pipe that is being operated upon.

Since a fairly constant linear speed of the cutting torches with relation to the surface of the pipe section is necessary in order that the cutting flames shall persist in contact with the metal for just a sufficient length of time to properly perform the cutting operation, the speed of rotation of operating shaft 3 must be slower for larger pipe diameters and faster for smaller pipe diameters. This necessary change of speed is effected by proper adjustment of the speed-changer 14.

The angle of inclination of the cuts produced in the pipes can be changed by adjusting either the inclination of the directing plate 25 or the radius of the circular path of travel of roller 24. However, unless the radius of the path of travel of the roller corresponds to the radius of the diameter of the pipe that is being cut, the angle of the directing plate 25 will not be identical with the angle of the cut surface. It is more convenient to adjust the roller in accordance with the diameter of the pipe and then set off the desired angle of cut directly on the sector 30. However, either method of adjustment could be used singly if desired.

If the directing plate 25 is positioned vertically, the machine can be used for making a cut perpendicular to the axis of the pipe (such as L in Fig. 10) for cutting off a straight-ended section of pipe.

Obviously the machine could be used with only a single torch, which could be adjusted for making an unbeveled cut or a cut beveled in only one direction.

I claim:

1. In a pipe cutting apparatus, a supporting frame, a shaft journaled for both rotary movement and bodily reciprocating movements longitudinally of the axis of the shaft, means for supporting a pipe section with its longitudinal axis in substantial prolongation of the axis of the shaft, a cutting torch, means for supporting the torch in offset relation at one end of the shaft so that the torch may be revolved about the pipe section as the shaft is rotated, means for rotating the shaft, and means for imparting one complete cycle of reciprocations to the shaft for each rotation thereof.

2. In a pipe cutting apparatus, a supporting frame, a shaft journaled for both rotary movement and bodily reciprocating movements longitudinally of the axis of the shaft, means for supporting a pipe section with its longitudinal axis in substantial prolongation of the axis of the shaft, a cutting torch, means for supporting the torch in offset relation at one end of the shaft so that the torch may be revolved about the pipe section as the shaft is rotated, means for rotating the shaft, means for imparting one complete cycle of reciprocations to the shaft for each rotation thereof, and means for adjusting the amplitude of the reciprocating movements.

3. In a pipe cutting apparatus, a rotary shaft, a cutting torch, means for supporting the torch in offset relation at one end of the shaft, means for rotating the shaft, a spring mounted to urge the shaft longitudinally in one direction, and means cooperating with the opposite end portion of the shaft for urging the shaft longitudinally in opposition to the spring.

4. In a pipe cutting apparatus, a rotary shaft, a cutting torch, means for supporting the torch in offset relation at one end of the shaft, means for rotating the shaft, a spring mounted to urge the shaft longitudinally in one direction, a roller supported in laterally offset relation at the opposite end of the shaft, and a member having a surface inclined to the axis of the shaft with which the roller engages to move the shaft longitudinally in opposition to the spring.

5. In a pipe cutting apparatus, a rotary shaft, a cutting torch, means for supporting the torch in offset relation at one end of the shaft, means for rotating the shaft, a spring mounted to urge the shaft longitudinally in one direction, a roller supported in laterally offset relation at the opposite end of the shaft, a directing plate against which the roller is held by the spring, and means for adjusting the inclination of the directing plate.

6. In a pipe cutting apparatus, a rotary shaft, a cutting torch, means for supporting the torch in offset relation at one end of the shaft, means for rotating the shaft, a spring mounted to urge the shaft longitudinally in one direction, a roller supported in laterally offset relation at the opposite end of the shaft, a directing plate against which the roller is held by the spring, said plate having a plane surface upon which the roller travels in a circular path, and means for adjusting the inclination of the directing plate.

7. In a pipe cutting apparatus, a rotary shaft, a cutting torch, a bracket for supporting the torch in offset relation at one end of the shaft, means for adjusting the bracket radially of the shaft in accordance with the diameter of the pipe to be cut, means for rotating the shaft, a spring mounted to urge the shaft longitudinally in one direction, a bracket arm adjustable radially at the opposite end of the shaft, a roller carried by this arm, and a member having an inclined surface with which the roller engages to move the shaft longitudinally in opposition to the spring.

8. In a pipe cutting apparatus, a rotary shaft, a cutting torch, a bracket for supporting the torch in offset relation at one end of the shaft, means for adjusting the bracket radially of the shaft in accordance with the diameter of the pipe to be cut, means for rotating the shaft, a spring mounted to urge the shaft longitudinally in one direction, a bracket arm adjustable radially at the opposite end of the shaft, a roller carried by this arm, a directing plate against which the roller is held by the spring, and means for adjusting the inclination of the directing plate.

9. In a pipe cutting apparatus, a rotary shaft, a cutting torch, a bracket for supporting the torch in offset relation at one end of the shaft, means for adjusting the bracket radially of the shaft in accordance with the diameter of the pipe to be cut, means for rotating the shaft, a spring mounted to urge the shaft longitudinally in one direction, a bracket arm adjustable radially at the opposite end of the shaft, a roller carried by this arm, a directing plate against which the roller is held by the spring, said plate having a plane surface upon which the roller travels in a circular path the diameter of which is adjusted to determine the path of travel of the cutting torch, and means for adjusting the inclination of the directing plate.

10. In a pipe cutting apparatus, a rotary shaft, a cutting torch, a bracket for supporting the torch in offset relation at one end of the shaft, means for adjusting the bracket radially of the shaft in accordance with the diameter of the pipe to be cut, means for rotating the shaft, a spring mounted to urge the shaft longitudinally in one direction, a bracket arm adjustable radially at the opposite end of the shaft, a roller carried by this arm, an inclined directing plate against which the roller is held by the spring, said plate having a plane surface upon which the roller travels in a circular path the diameter of which is adjusted by moving the roller-supporting bracket radially of the shaft to determine the path of travel of the cutting torch.

11. In a pipe cutting apparatus, means for supporting a section of pipe, a torch support, means for revolving the torch support around the pipe, and for simultaneously reciprocating the torch support parallel to the longitudinal axis of the pipe, and a pair of cutting torches carried by the support and inclined toward one another so as to form a single cut in the pipe with oppositely bevelled edges.

12. In a pipe cutting apparatus, a supporting frame, a main shaft journaled in the frame for both rotary and longitudinal reciprocating movements, a rotary driving shaft, gear connections between the driving shaft and main shaft for transmitting rotary movement to the main shaft, said connections comprising relatively slidable members whereby the main shaft may move longitudinally of its axis independently of the driving shaft, a nonrotary bracket member projecting from the main shaft but connected to travel longitudinally therewith, a spring connected between the bracket and a portion of the supporting frame for urging the main shaft in one direction, a radially adjustable bracket mounted on that end of the main shaft toward which the shaft is urged by the spring, an inclined directing plate mounted on the supporting frame adjacent this end of the shaft, a roller carried by the adjustable bracket in position to travel in a circular path on the directing plate, means for adjusting the inclination of the directing plate, means for supporting a pipe section adjacent the opposite end of the main shaft and in axial alignment therewith, a radially adjustable bracket member mounted on this latter end of the main shaft and having an arm projecting substantially parallel with the axis of the pipe so as to revolve therearound as the main shaft is rotated, and a cutting torch carried by the arm and directed toward the surface of the pipe.

13. In a pipe cutting apparatus, a supporting frame, a main shaft journaled in the frame for both rotary and longitudinal reciprocating movements, a rotary driving shaft, gear connections between the driving shaft and main shaft for transmitting rotary movement to the main shaft, said connections comprising relatively slidable members whereby the main shaft may move longitudinally of its axis independently of the driving shaft, a nonrotary bracket member projecting from the main shaft but connected to travel longitudinally therewith, a spring connected between the bracket and a portion of the supporting frame for urging the main shaft in one direction, a radially adjustable bracket mounted on that end of the main shaft toward which the shaft is urged by the spring, an inclined directing plate mounted on the supporting frame adjacent this end of the shaft, a roller carried by the adjustable bracket in position to travel in a circular path on the directing plate, means for supporting a pipe section adjacent the opposite end of the main shaft and in axial alignment therewith, a radially adjustable bracket member mounted on this latter end of the main shaft and having an arm projecting substantially parallel with the axis of the pipe so as to revolve therearound as the main shaft is rotated, and a cutting torch carried by the arm and directed toward the surface of the pipe.

14. In a pipe cutting apparatus, a supporting frame, a main shaft journaled in the frame for both rotary and longitudinal reciprocating movements, a rotary driving shaft, a source of power, speed-changing mechanism interposed between the source of power and the driving shaft, gear connections between the driving shaft and main shaft of transmitting rotary movement to the main shaft, said connections comprising relatively slidable members whereby the main shaft may move longitudinally of its axis independently of the driving shaft, a nonrotary bracket member projecting from the main shaft but connected to travel longitudinally therewith, a spring connected between the bracket and a portion of the supporting frame for urging the main shaft in one direction, a radially adjustable bracket mounted on that end of the main shaft toward which the shaft is urged by the spring, an inclined directing plate mounted on the supporting frame adjacent this end of the shaft, a roller carried by the adjustable bracket in position to travel in a circular path on the directing plate, means for adjusting the inclination of the directing plate, means for supporting a pipe section adjacent the opposite end of the main shaft and in axial alignment therewith, a radially adjustable bracket member mounted on this latter end of the main shaft and having an arm projecting substantially parallel with the axis of the pipe so as to revolve therearound as the main shaft is rotated, and a cutting torch carried by the arm and directed toward the surface of the pipe.

FRANK J. DOUGLASS.